United States Patent [19]

Anderson

[11] Patent Number: 4,576,562

[45] Date of Patent: Mar. 18, 1986

[54] APPARATUS FOR PRODUCING FROZEN CONFECTIONS

[75] Inventor: David N. Anderson, Lakeland, Fla.

[73] Assignee: FMC Corporation, Chicago, Ill.

[21] Appl. No.: 604,776

[22] Filed: Apr. 27, 1984

[51] Int. Cl.[4] .................... A23G 9/26; A23G 9/30
[52] U.S. Cl. .......................... 425/126 S; 62/345;
    62/356; 198/792; 425/137; 425/139; 425/225;
    425/231; 425/259; 425/439
[58] Field of Search ............... 425/126 S, 117, 137,
    425/139, 439, 436, 256, 259, 225, 231; 62/345,
    356; 198/292

[56] References Cited

U.S. PATENT DOCUMENTS

| | | | |
|---|---|---|---|
| 985,601 | 2/1911 | Johnson | 62/345 |
| 2,166,380 | 7/1939 | Taylor | 425/126 S |
| 2,252,913 | 8/1941 | Baer | 62/345 |
| 2,534,054 | 12/1950 | Parkes | 198/681 |
| 3,031,066 | 4/1962 | Leach | 198/792 |
| 3,031,978 | 5/1962 | Rasmussen | 62/345 |
| 3,162,297 | 12/1964 | Leach | 198/792 |
| 3,488,976 | 1/1970 | Hirahara et al. | 62/356 |
| 3,535,889 | 10/1970 | Curti | 62/322 |
| 3,695,895 | 10/1972 | Brown | 62/345 |
| 4,171,739 | 10/1979 | Yamato | 198/792 |
| 4,227,606 | 10/1980 | Bogatzki | 198/792 |
| 4,330,245 | 5/1982 | Billet et al. | 425/137 |
| 4,392,803 | 7/1983 | Cross et al. | 425/126 S |
| 4,425,089 | 1/1984 | Billett et al. | 425/126 S |

FOREIGN PATENT DOCUMENTS

| | | | |
|---|---|---|---|
| 519344 | 7/1951 | Canada | 425/126 S |
| 510318 | 2/1955 | Canada | 425/126 S |
| 1174194 | 7/1964 | Fed. Rep. of Germany | 198/792 |
| 653434 | 6/1948 | United Kingdom | 198/792 |

Primary Examiner—Willard E. Hoag
Attorney, Agent, or Firm—Richard B. Megley; Louis J. Pizzanelli

[57] ABSTRACT

The disclosed frozen confection machine is provided with a series of mold bars each of which contain a plurality of cavities for containing confection material which is frozen in said cavities. The machine is provided with a mechanism for inserting sticks into the partially frozen confection material, means for defrosting the exterior of the cavities to facilitate removal of the frozen confections and a selectively operable device responsive to the inadvertent retention of confection material in one or more cavities to remove the retained confection material by inverting the mold bar and spraying hot water into the cavities to remove the confection material. Moreover the confection machine provides laterally opposed to chains circulating in a closed path in which one reach of the chain, the working reach, associated with filling, freezing, stick insertion and confection removal devices and a return reach. The working reach of the chains are collapsed crowding the series of mold bars in substantially abutting relationship to thereby provide a solid wall of mold bars. This arrangement substantially reduces the number of mold bars required for producing a given number of confections per unit time, substantially reduces contamination of its cavities with brine and substantially reduces the amount of water used since washing of the mold cavity is selective.

21 Claims, 6 Drawing Figures

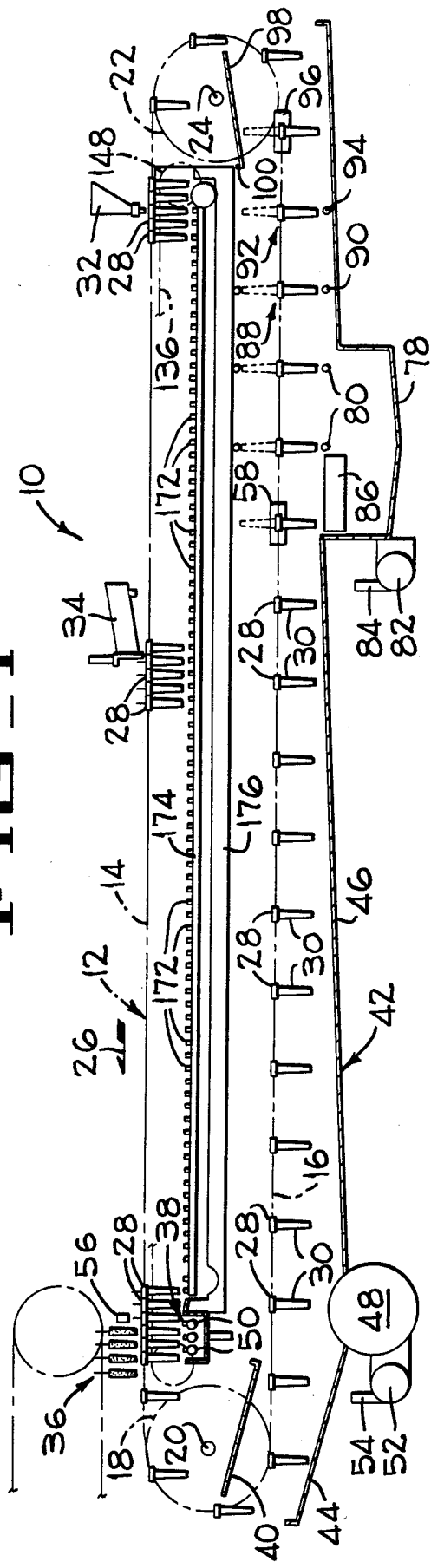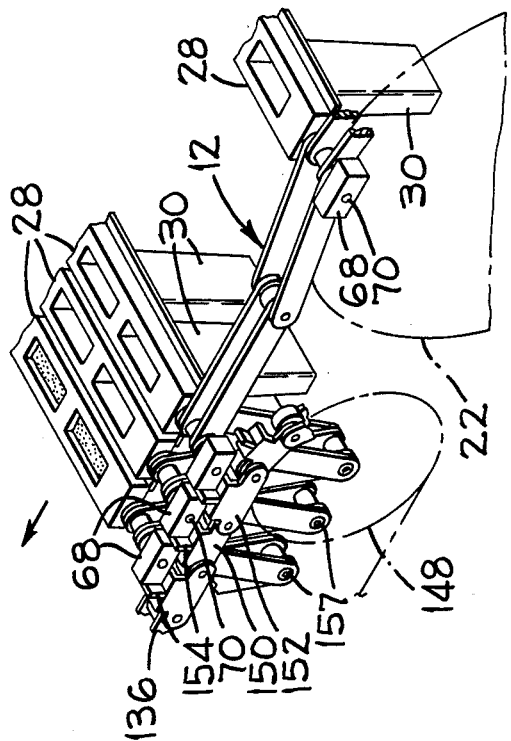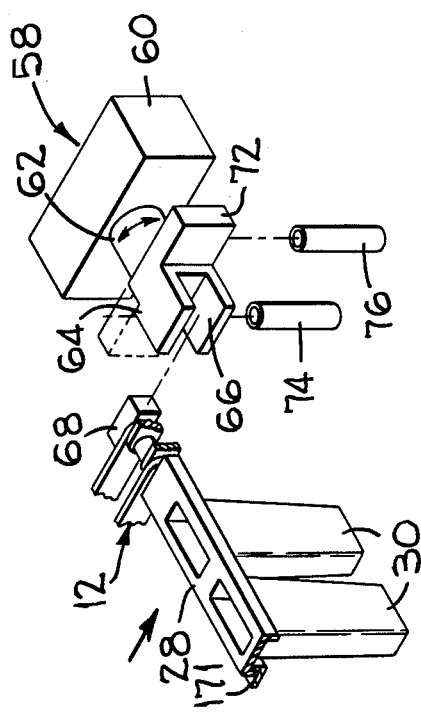

FIG_2

FIG_3

FIG_6

APPARATUS FOR PRODUCING FROZEN CONFECTIONS

The present invention relates to an apparatus and method for producing frozen confections and more particularly frozen confections of the variety that has a projecting stick imbedded therein.

Patented prior art relating to the subject matter of the present disclosure are the patents to: M. B. Rasmusson U.S. Pat. Nos. 2,850,051, 2,850,990, 2,884,875, 3,031,978, 3,407,755; J. F. French et al U.S. Pat. No. 3,252,165; P. W. Lampman U.S. Pat. No. 3,280,791; R. J. Billett U.S. Pat. Nos. 4,324,108, 433,245, 4,352,830, 4,335,583; B. M. Harper U.S. Pat. No. 4,323,336; S. D. Cross U.S. Pat. No. 4,392,803 and J. S. Brown U.S. Pat. No. 3,695,895. All of the above patents are assigned to the assignee of the present invention and by reference thereto it is intended that their disclosures be incorporated herein.

The frozen confection machine according to the present invention reduces the number of mold bars required to achieve a desired production rate, and as a result the overall size or footprint of the machine is reduced substantially.

Further according to the present invention a significant reduction in the use of water for cleaning the mold cavities is realized as cleaning occurs on a selective basis in response to a monitoring device which determines whether one or more confections are retained in the cavities of a mold bar.

Further according to the present invention and, resulting from the selective washing of the mold bar cavities, the residue following extraction of the confections is retained in the cavities yielding a significant decrease in the amount of confection material necessary to produce an acceptable confection.

Also achieved by the apparatus of the present invention is a significant savings in brine, partly achieved by maintaining the mold bars oriented such that the cavities or the entry mouth faces upward during its movement in the closed path. As the molds leave the extraction station and pass an arc defined by the sprockets, brine on the exterior of the cavities is collected in a trough as the mold bars progress along the return reach of the conveyor chains. The brine is collected and since its temperature has increased it is collected and is pumped into manifolds that spray warm brine on the exterior of the cavities to effect defrosting to facilitate extraction, of the confections by an extraction device.

BRIEF DESCRIPTION OF THE DRAWINGS

FIG. 1 is a diagrammatic elevation of a frozen confection machine incorporating the novel construction and mode of operation of the present invention, FIG. 2 is an enlarged elevation of an indexing drive and a transfer mechanism operative to collapse or fold the chain as the mold bars commense traversing the upper reach of the closed path, FIG. 3 is similar to FIG. 2 and illustrates indexing of the mold bar supporting chain, FIG. 4 is a fragmentary prospective depicting the close association of the mold bars during their passage along the upper reach of the closed path, FIG. 5 is a diagrammatic prospective of a selectively operable mold bar inverting a rollover mechanism operative in response to a signal indicating the failure to remove a confection at the extraction station, and FIG. 6 is a section taken substantially along the line 6—6 of FIG. 2.

DESCRIPTION OF THE PREFERRED EMBODIMENT

A machine incorporating the novel apparatus of the present invention is shown in FIG. 1 and generally identified by the numeral 10. The principal components of the machine include elongate chains 12 following a closed path including an upper reach 14 and a lower reach 16. The chains 12 cooperates with a pair of idler sprockets 18 (only one of which is shown) keyed to a shaft 20 carried by the frame of the machine (not shown). A similar pair of driving sprockets 22 are keyed to a shaft 24. The pair of opposed chains 14 (only one of which is shown) carry a mold bar 28 connected to an elongate pin pivotally interconnecting alternative chain links. Each mold bar is formed with a plurality of transversely extending cavities 30 in which is deposited confection material to produce, after being provided with a stick and frozen in a solid mass, a hand held confection.

In the course of traversing upper reach 14 each cavity 30 carried by the mold bars 28 is filled with confection material by a conventional filler 32 and after the confection material is partially solidified, by having cold brine sprayed on the exterior of the cavity 30, sticks are inserted into the confection contained in each cavity by a conventional stick inserting mechanism 34. As each mold cavity progresses toward the sprockets 18 freezing by spraying cold brine continues to achieve complete solidification before removal of the completed confection from the cavities by an extraction mechanism 36. Release of the bond created by freezing the confection material in the cavity is effected by providing spraying means 38 that continually bathes the outer surface of the cavities with warm brine which thereby diminishes the bond between the confection material and the cavity. After extraction of the confections from the cavities of a mold bar the sprockets 18 direct the chains 12 in an arcurate path to the lower reach 16. As mentioned above the mold bars 28 are freely pivotally connected to alternative links of the chains 12 so that the opening or mouth of the cavity 30 at all times face upwardly.

As successive mold bars emerge from the defrost station 38, and after the confections have been extracted, the surfaces of the cavities and the mold bar exposed to the warm brine spray are coated with brine which naturally flows downwardly and drips off the bottom end of the cavities 30. As the mold bars travel around the sprockets 18 the mold bars emerging from the upper reach and those entering the lower reach 16 cross over in progressing toward, around and away from the sprocket 18. Brine dripping from the upper mold bars will enter the cavities of the mold bars progressing toward the lower reach. Thus, the mold bars and their cavities become contaminated which will require washing of each individual cavity before filling with confection material by the filler 32 takes place.

To reliably prevent contamination of the mold bar 28 and its cavities 30 a flat inclined pan or barrier 40 is mounted between the sprockets 18 to intercept brine dripping from the outer surface of the mold bars 28 or the cavities 30 and direct the intercepted brine into a trough 42 having inclined walls 44 and 46 directing accumulated brine to a well 48. The temperature of the brine in the well 48 is sufficiently elevated to effect defrosting. Accordingly brine from the well 48 is supplied to a plurality of manifolds 50, each of which is provided with a plurality of nozzles, by a pump 52 which has its discharge 54 connected to supply brine to the manifolds 50.

According to the present invention means are provided for detecting the failure to remove one or more confections from one or more cavities in any particular mold bar and storing this information to invert that particular mold bar at a particular point during its passage along the lower reach 16 of the chains 12. To achieve selective inversion or rollover of a mold bar such that the mouth of the cavities 30 face downwardly, a variety of systems can be used. For example, coding the mold bars or, since the chains 12 are intermittently advanced by an indexing unit which will hereinafter be described, a counting mechanism that counts each index of the chains can be used to energize and render operative a rollover mechanism when that mold bar arrives at a certain point in its progress along the lower reach 16. The means for effecting selective rollover comprise a transverse row of sensors or detecting devices 56 operative to detect the presence or absence of one or more confections from a transverse row of confections withdrawn from the cavities 30 by the extraction mechanism 36. The sensors may have their output connected to an electronic information processing unit which will retain in memory one or more mold bars containing a confection or confections which have not been removed by the extracting mechanism 36.

Means 58, responsive to the output of a stored input signals derived from the sensors 56 is provided for inverting or rolling over a mold bar at a selective point of the return reach 16. The inverting means 58 is illustrated in greater detail in FIG. 4. A unit found suitable for this purpose is model A-100 made by Flo-Tork, Inc. of Orrville, Ohio. Essentially, the inverting device 58 comprises a housing 60 in which resides a pressure fluid operated linear actuator operating to rotate an output shaft 62 through an arc of 180°. Affixed to the shaft 62 is a block 64 formed with slot 66 through which a block 68, secured to a pin 70 (FIG. 5) pivotally interconnecting every other link of the chains 12. The block 64 is formed with a transverse finger or extension 72 which is rotated by the actuator in the housing 60 in an arc subtended by an angle of 180° to assume a position adjacent one of two sensors 74 and 76. The sensors 74 and 76, while shown displaced from the finger 72 are located approximately 1/16 of an inch from the surface of the finger 72 "seen" by the sensors. The sensors are of sufficient sensitivity to provide a signal in the event the surface of the finger 72 is spaced therefrom a distance greater than the preset distance of 1/16 of an inch. In that event, normal machine operation will be interrupted and appropriate alarms or indicators are provided to make the operator aware of the fact that the shaft 62 has not been oscillated the prescribed 180°. As the chains 12 are indexed successive mold bars, each of which are provided with a block 68 at each end thereof, dwell such that the lugs 68 reside in the slot 66 so that in the event turning over of a mold bar is called for by the detecting device 56 the actuator in the housing 60 is energized inverting the mold bar and accordingly allow discharge, by gravity or other suitable means such as high pressure sprays, of retained confection material in one or more of the cavities 30. The inverting means 58 whether it takes the position whereby the finger 72 is adjacent the sensor 76 or the sensor 74 not only locates the slot 66 so that the lugs 68 can pass freely therethrough but effects inverting of a mold bar whether inversion commences from the sensor 74 to the sensor 76 or from the sensor 76 to the sensor 74.

The trough 42 is formed with a downwardly depressed portion 78 defining a pool or a well for containing a quantity of water mixed with soap or detergent which is distributed to spray bars 80 by a pump 82 having its discharge 84 suitably connected to the spray bars 80. The inverted molds are sequentially washed by the detergent water issuing from orifices or nozzles in the spray bars 80. As the molds progress along the return reach 16, defrosting occurs since ambient temperature conditions prevail. When a mold bar to be inverted arrives at the inverting means 58 and it is inverted and the retained confection material will fall by gravity out of the cavity and be received upon a conveyor 86 running transversely to the direction of movement of the chains 12 and the confection material is disposed of in any suitable way. As mentioned previously the inverted mold bar as it is positioned in line with the spray bars 80 is washed. The washing water is returned to the pool or well 78. After the inverted mold bar is indexed one step beyond the spray bars 80 is aligned with a rinsing station 88 which includes another spray bar 90 connected to a source of municipal water supply, and provided with nozzles for spraying water into the cavities of the inverted mold bar and thereby remove traces of soap or detergent applied by the spray bars 80. Rinsing water drains into the pool or well 78. When a mold bar is advanced another step it encounters and dwells at sanitizing station 92 which is also provided with a spray bar 94 which may take the form of the split manifold having one passage way connected to a source of pressure air and another connected to a source of water mixed with chlorine or iodine. While such a spray bar manifold is conventional in the art it's essential mode of operation involves connecting one passageway with a source of pressure air and the other with a source of sanitizing fluid such as chlorine or iodine. Opening of an air valve admitting the pressure air to one portion of the manifold and directing the pressure air through nozzles combines the sanitizing fluid into the stream issuing from the nozzle.

On advancing successive mold bars from the sanitizing station 92, another inverting means 96 is positioned in the path of the lower reach and each mold bar momentarily comes to rest at the inverting means. In the event the particular mold bar was inverted by the first inverting means 58 the second inverting means 96 will reposition the mold bar so that the mouth of the cavities 30 face upwardly. Signaling the inverting means 96 to effect inversion is contained in the programmable controller being operative to effect selective inversion.

The chains 12 progress from the lower reach 16 to the upper reach 14 by traveling around the sprockets 22. Any liquid coating the mold bars and the exterior of the cavities is prevented from entering the mold cavities as they progress around the sprockets 22 by a pan 98 inclined to direct liquid back to the trough 42. It should be observed that the pan 98 is provided with an upturned and 100 providing a barrier to define a flows path for accumulating liquid to return to the trough 42 at a point laterally of the path described by the mold bars 28.

In accordance with a principal feature of this invention, means are provided as the mold bars arrive and progress along the upper reach 14 for changing the distance or pitch between successive mold bars so that in the course of transiting the upper reach 14 the mold bars establish a substantially solid wall. In effect, therefore, the time required for a particular mold bar to travel along the upper reach may, for example, take six times longer than the time period required in its transit along the lower reach 16 because the successive mold bars establish a pitch which is approximately six times greater than the pitch between the mold bars during their transit along the upper reach. A variety of benefits are derived from the pitch change between successive molds. For a given machine output, that is frozen confections per minute, a lesser number of mold bars are necessary, the time required to effect freezing is decreased, for each foot of additional machine length only seven mold bars are required as opposed to 12 mold bars per foot of machine length of machines presently in use, washing all of the mold bars and the cavities during each circuit is eliminated since the mouth of the cavities always face upwardly, a significant reduction in the amount of brine used since it is all recovered, the machine cycle time is reduced increasing the production rate from 25 to 40% over machines presently in use, and by spraying brine on the exterior surface of the mold cavities and by directing the spray to the area of the mold cavity containing a thickest portion of the confection material, quicker freezing is achieved.

FIG. 2 illustrates the means for changing the distance or pitch between successive mold bars and is generally identified by the numeral 102. Indexing of the chains 12 effecting step wise advance of the chains in the direction of the arrow 26 is achieved by a linear actuator 104 having its head end pivotally connected at 106 to a stationary bracket 108 carried by the frame of the machine. The output rod of the actuator 104 is pivotally connected at 110 to a crank arm 112 keyed to the shaft 24 which also has affixed thereon the sprockets 22. A pawl 116 is freely pivotally connected at 118 to the crank arm 112 and it has its free end formed with an arcuate depression or pocket 120 which forceably engages and retains pins 122 carried by and projecting from one of the sprockets 22. It should be noted that the illustrated sprocket 22 carries four pins being equally circumferentially spaced at a radial distance less than the radius of the sprocket 22.

On extension of the actuator 104 the pin 122 adjacent to pawl 116 is seated in the pocket 120 and as the actuator 104 continues to extend sprockets 122 are rotatably displaced through a central angle of 90°.

To insure that the sprocket is advanced in 90° increments a stop mechanism 124, having a finger in the path or locus of the pins 122, is provided. The stop mechanism includes a finger 126 pivotally mounted at 128 in a block 130 secured to a frame member of the machine (not shown). The relative position of the pins 122 and the crank arm 112 prior to extension of the actuator 104 is shown in FIG. 2. It should be noted that one of the pins 122 is against the tip of the finger 126. Moreover the crank arm 112 is formed with an extension 132 that engages the finger 126 and thereby establishes the maximum extent of extension of the actuator 104. On reaching this limit a pin 122 seats against the tip of the finger 126 while when indexing movement is initiated the finger 122 adjacent to the tip of the finger 126 causes pivotal movement of the finger which is limited by stop buttons 134. On retracting the actuator 104 in preparation to effect indexing movement the pawl 116, by pivoting around the pivotal connection 118, freely passes over the pin 122 positioned to be engaged by the pawl 116.

As the chains emerge from the sprockets 22 towards the upper reach 14 the pitch changing means 102, which is provided with stationary camming surfaces, causes selected alternative length of the chains to assume a folded condition as illustrated in FIGS. 2, 3 and 5. Moreover as individual successive mold bars enter and reside on the upper reach 14 translation of the chains 12 along the upper reach is effected by a pair of additional chains 136 which are intermittently driven by the linear actuator 104. On a transverse shaft 138, rotatably mounted in suitable bearings carried by the frame of the machine, a sprocket 140 is keyed and is driven by a chain 142 in mesh with a sprocket 144 keyed to the shaft 24 and thus intermittently rotated by the actuator 104. Proper tension is maintained for the chain 142 by an idler tensioning sprocket 146. Also keyed to the shaft 138 are a pair of sprockets 148 which, by virtue of being keyed to the shaft 138, intermittently advance the chains 12 along the upper reach 14. The sprockets 148 drive chains 136, which are provided with interconnecting pinned plates 150 and 152 each of which is formed with a projecting lug 154. As shown in FIGS. 2 and 5 the blocks 68 mounted on the outboard end of the pins 70 are deployed and captured between adjacent successive lugs 154 as the driving force of the chains 12 is transferred from the sprocket 22 to the sprockets 148.

As the chains 12 emerge and are advanced from the sprockets 22 to the sprockets 148 the pivotal connection of the chain links between the pivotal connection carrying the blocks 68 is directed downwardly while the pivot connections carrying the outboard blocks 68 are restrained from pivoting or folding by a support rail 156. More particularly, alternative pivot connections 157 are directed by a stationary camming rail 158 to move downwardly (as viewed in FIG. 2) toward the shaft 138 by profiling the cam 158 to define a cusp 160 (FIG. 3) defining the intersection of sloping surfaces 162 and 164. The following pivotal connections of the chains 12 carrying the blocks 68, which are outboard of the path of the pivotal connection 157, are restrained or prevented from folding by the rail 156 slidably engaged by the blocks 68. FIG. 6, which is a partial transverse section taken substantially along the line 6—6 of FIG. 2, illustrates the relationship of the blocks 68, the support rail 156 and the camming rail 158.

As the pivotal connections 157 of the chains 12 are directed downwardly, the path described as the adjacent links become fully folded is indicated by a surface 168 of a plate 170 which in part constitutes a shroud for the surface of the sprockets 22. The surface 168 will not under ordinary circumstances be in rolling or sliding contact with the bushing of the pivot connections 157 since it serves to maintain a small gap or space from the surface of the bushing in order to prevent undue wear. However, in the event some unanticipated problem arises, the surface 168 of the plate 70 will direct folding of the chains 12 at the pivot connections 157 and yet prevent re-engagement with the driving surfaces of the sprockets 22.

As shown in FIG. 4, each of the mold bars 28 are formed with a lip 171 so that when the mold bars are in engagement with the chains 136 (FIG. 5) the gaps between the mold bars are closed thereby creating a solid wall.

During excursion of the mold bars along the upper reach 14, cold brine is sprayed by nozzles 172 to the upper portion of the cavities 30 along substantially the entire length of the upper reach 14. The nozzles 172 are connected to manifolds 174 which are supplied from a conventional source with brine under pressure. The brine dripping from the cavities 30 accumulates within a brine tank 176. Accumulated brine is recirculated to the refrigerating unit before being supplied to the manifolds 174. For further details concerning the spraying of brine reference can be made to U.S. Pat. Nos. 4,335,583 and 4,324,108 to R. J. Billett.

Although the best mode contemplated for carrying out the present invention has been herein shown and described, it will be apparent that modification and variation may be made without departing from what is regarded to be the subject matter of the invention.

What is claimed is:

1. In an apparatus for producing frozen confections, the improvement comprising;
   a pair of endless laterally spaced chains traveling in a closed path defining upper and lower horizontal reaches;
   means for intermittently advancing said chains;
   elongate mold bars formed with a plurality of cavities for retaining confection material;
   means for pivotally connecting the ends of said mold bars to every other pin connection of the links of said chains so that the mouth of the cavities face upwardly during movement in the closed path, means for decreasing and maintaining constant the pitch of said chains during their passage along the upper reach of the closed path.

2. The apparatus according to claim 1 wherein the improvement further comprises means for defrosting the cavities to facilitate removal of the confection material contained therein, said defrosting means comprising means for spraying warm brine to the underside of the cavities, means for collecting warm brine dripping from the cavities, and means for pumping and distributing the warm brine from the collecting means to the underside of the cavities.

3. The apparatus according to claim 1, wherein the improvements further comprises means for filling, freezing, defrosting, and extracting frozen confection material from each of the cavities, means for detecting the retention of confection material in one or more cavities, and means in said lower reach being responsive to said detecting means for inverting said mold retaining confection material and removing such material from its cavity or cavities.

4. In a frozen confection machine the improvement comprising; a plurality of mold bars defining mold cavities and having their ends pivotally connected to laterally spaced chains describing a path having vertically spaced horizontal working and return reaches, means operative as successive mold bars enter the working reach for reducing the distance between the mold bars to the extent that the mold bars form a substantially solid wall along the working reach, and means operative as the mold bars emerge from the working reach to increase the distance between successive mold bars.

5. In apparatus as in claim 4, the improvement further comprising means to maintain an upright orientation of said mold cavities throughout the path of travel of the molds.

6. In the frozen confection machine according to claim 5 the improvement further comprising means along the working reach and below the wall formed by said mold bars for spraying a refrigerated liquid against the outside surfaces of molds defining said cavities carried by each mold bar, and means as the mold bars travel from and to the return reach for preventing contamination of the cavities with brine dripping from the surface of the cavities.

7. In a frozen confection making machine employing laterally spaced chains having links pivotally interconnected by pins and bushings drivingly engaging longitudinally spaced sprockets driving the chains in an orbit defining an upper reach and a lower reach, said chains pivotally carrying therebetween at corresponding alternative pin and busing connections mold bars having a plurality of cavities for containing confection material, the improvement comprising means operative as the chains arrive at the upper reach for diverting the pivotal connection between the alternative pin and bushing connections from the plane containing the upper reach, and means engageable with a lug carried by the non-diverted connection for driving the chains along the upper reach.

8. The machine according to claim 7 wherein said diverting means comprises a camming surface engageable with successive bushings of the chain and being formed to direct the bushings from the plane of the upper reach.

9. The machine according to claim 7 the improvement further comprising means slidably engaging the lug as the chains enter the upper reach to thereby prevent diversion of the alternative pins.

10. The machine according to claim 7, the improvement further comprising means ahead of said upper reach to relieve said chains of tension.

11. In a frozen confection making machine employing laterally spaced chains having links pivotally interconnected by pins and bushings drivingly engaging longitudinally spaced sprockets driving the chains in an orbit defining an upper reach and a lower reach, the improvement comprising: mold bars, having a plurality of cavities for containing confection material, pivotally connected at corresponding alternative pin and bushing connections of the chains; means, operating as the chains arrive at the upper reach, for diverting the pivotal connection between the alternative pin and bushing connections from the plane containing the upper reach; and means engageable with a lug carried by the nondiverted connection for driving the chains along the upper reach.

12. The machine according to claim 11 wherein said mold bars are provided with a lip underlying the edge of an adjacent mold bar to produce a solid wall during transit along the upper reach.

13. The machine according to claim 12 the improvement further comprising means below and substantially coextensive with the upper reach for distributing cold brine to the outside surface of molds defining the cavities to effect solidification of the confection material.

14. The machine according to claim 13 wherein said means for distributing brine comprises a plurality of nozzles producing streams of cold brine directed to the outside surface of the cavities, said streams tending to produce misting which is substantially confined between the solid wall and the brine distributing means.

15. In a confection making machine, the improvement comprising laterally spaced chains traveling in an orbit defining upper and lower horizontal reaches, elongate mold bars each having a plurality of confection containing cavities, said mold bars extending between and being pivotally carried by alternative pins of said chain, longitudinally spaced pairs of sprockets engaging successive pins of the chains, means for driving one pair of the sprocket to effect movement of the chains in the lower reach, and means engaging a lug mounted on the alternative pins for folding and driving the chains along the upper reach.

16. In a frozen confection machine employing laterally spaced endless flexible members driven in an orbit defining an upper reach and a lower reach, means for driving said members, elongate mold bars, provided with a plurality of cavities for containing confection material and extending transversely to and connected at longitudinally spaced intervals to the flexible members, the improvement comprising means for pivotally connecting the mold bars to said members, said pivotal connection including means driven by said driving means, means operative as the flexible members commence movement along the upper reach for diverting the portion of the members between said pivotal connections from the plane containing the upper reach to thereby locate successive mold bars in close relationship for substantially the entire extent thereof, said means of said pivotal connection driven by said drive means maintaining the close relationship of said mold bars during their passage along the upper reach.

17. In a frozen confection machine of the character wherein elongate mold bars each having at least one cavity are connected between driven flexible members describing an orbit having an upper reach and a lower reach, the improvement comprising means for pivotally connecting the mold bars to said members so that the orientation of the cavity is such that their openings face upwardly throughout the orbit, means for driving said members and the mold bars connected thereto in the orbit, said mold bars being connected to said members at regularly spaced intervals, means for moving the mold bars into closer proximity to each other as successive mold bars arrive at the upper reach, and means for maintaining the close proximity of the mold bars for substantially the entire extent of the upper reach.

18. A frozen confection machine of the type employing mold bars, each having at least one cavity for retaining confection material, moveable in a closed path having vertically spaced substantially planar horizontal paths, said machine comprising means for moving said mold bars in said path,
and means for maintaining said mold bars oriented so that the mouth of the cavity faces upwardly during movement in said path,
said moving means including means for positioning successive mold bars into closer proximity during movement along the upper one of said horizontal reaches.

19. The confection machine of claim 18 wherein said moving means increases the distance between mold bars during movement along the lower one of said horizontal reaches, and means for inverting mold bars determined to contain a non-extracted confection in its cavity.

20. The confection machine according to claim 19 further comprising means for removing confection material from the cavity of the inverted mold bar, means for sanitizing the cavity, and means for inverting the mold bar to assume its orientation wherein its mouth faces upwardly.

21. A machine for freezing edible products comprising a plurality of mold bars each having at least one cavity for receiving and containing freezable products, means for moving said mold bars in a closed continuous path having at least two spaced linear segments, means for connecting said mold bars to said moving means so that the mouth of cavities face upwardly during movement in said path, means along at least one linear segment of said path for distributing a refrigerated liquid to the exterior surface of the cavities, means for locating successive mold bars in close proximity during their passage along the refrigerated liquid distributing means, means for filling the cavities with the freezable edible product, means for defrosting and extracting the solidified product from the cavities, means for detecting the retention of frozen produce in a cavity, means for increasing the distance between mold bars at least during their movement along another of said linear segments of the path, means operative in response to a signal that frozen product has been retained by a cavity for inverting the mold bar associated therewith, means for removing the retained product and sanitizing the cavity, and means for inverting the mold bar to its original upwardly facing position.

* * * * *